Patented May 8, 1945

2,375,195

UNITED STATES PATENT OFFICE 2,375,195

COATING AND METHOD OF PREPARING SAME

Ogden Carmichael, Seattle, Wash., assignor to I. F. Laucks, Inc., Seattle, Wash., a corporation of Washington No Drawing. Application December 15, 1942, Serial No. 469,123

5 Claims. (Cl. 106—161)

The present invention relates to a method of making and using an adhesive coating which is the reaction product of soluble blood albumen and a phenolic element and to the resulting products. It is to be understood that the invention is not restricted to any specific application.

An object is to provide an inexpensive coating material which is easily applied and strongly adherent to wood and porous surfaces and adapted both to provide an antiseptic treatment and to serve as an undercoat for finishing coats of paint or varnish.

Another object is to provide a spreadable coating available in an inexpensive aqueous vehicle and adapted to serve as a thermosetting adhesive suitable for uniting wood and porous materials as in the manufacture of hot pressed plywood.

A further object is to provide an adhesive capable of producing weather-resistant hot pressed plywood of exterior grade as embodied in "Standards for exterior plywood" as adopted by the Douglas Fir Plywood Association, of Tacoma, Washington.

An additional object of the invention is to provide a coating and adhesive in which a high standard of uniformity is maintained and characterized by the absence of formaldehyde in preparing the reaction product.

An equally important object of the invention is to produce laminated articles, particularly an improved plywood by using the aforesaid adhesive.

The adhesive and coating as well as laminated articles are made by simple methods and at substantial savings as has been demonstrated by successful usage of the invention.

The following examples illustrate preferred embodiments of the invention, but it will be understood that the proportions and ingredients may be modified to give products having the properties and characteristics and suitable for the uses, as described herein.

Example I

About 600 parts by weight of soluble blood albumen are stirred for about 30 minutes with approximately 500 parts of water and then an additional substantially 100 parts of water are stirred into the mixture. The normal pH of this aqueous suspension will preferably be about pH 7 and I find that satisfactory glues can be made where the pH range is between about 6 and 7.5. To this mixture is then added about 135 parts of crude cresylic acid to which about 10 cc. of substantially 40% NaOH have been added to give a critical pH of between about 7 and 10 in the final adhesive reaction product, i. e., in this example of about pH 8.5. The pH adjustment of the phenol may vary to give such critical pH of the final adhesive and in the present instance the adjustment of the phenol when added to the mixture is to about pH 9.4. Equivalents for the caustic soda are any soluble alkali capable of producing a pH range between the limits of about 7 and 10. These include caustic potash, ammonia, lime and various organic alkalies such as triethanolamine. However, from the standpoint of convenience and cost, caustic soda is preferable. This mixture is stirred for about five minutes and then about 200 parts of additional water are stirred in. The product is a smooth, dark-colored adhesive having a viscosity between substantially 10 and 15, #26 wire MacMichael, and a storage life of around sixty days. The foregoing mixing operations are all carried out at room or normal atmospheric temperature. Microscopic examination shows that the adhesive is an aqueous suspension of very finely divided amorphous gel-like particles of a chemical reaction product or compound of blood and phenol. It is to be noted that a predominant amount of blood over phenol is preferred.

The adhesive may be used in the manufacture of plywood, being applied to a ply surface to be bonded preferably at the rate of about 60 to 75 pounds per square foot of double glue line (3 ply board). Moisture content of the material to be glued is not critical and may range from approximately 1% to 20%. The plies or panels having one or both opposed surfaces coated with adhesive are formed into a built-up structure. The panels or built-up plywood structure may be hot pressed at any time up to 20 minutes after application of the glue. The bonding pressure used is limited by the ease of densification of the species of wood being laminated and usually ranges from about 150 to 200 pounds per square inch. Press plate temperature may vary from about 200° F. to about 260° F., depending on the thickness and construction of the plywood assembly and the moisture content of the plies. The time during which the assembly is subjected to heat and pressure may range from about 4 minutes for two $\frac{1}{16}$" panels pressed simultaneously in a press opening up to about 8 minutes for a single 1" panel per opening. The resulting plywood, if made from Douglas fir veneer, readily passes the published "Standards for exterior plywood" as adopted by the Douglas Fir Plywood Association.

It is to be noted that the adhesive of the present invention consists of blood, cresylic acid and water with the pH of the final adhesive mixture adjusted by adding a small amount of caustic soda or other alkali. I find that the pH adjustment of the adhesive is highly important and the cresylic acid or other phenolic element must be adjusted to give pH limits for the final adhesive of between about 7 and 10, preferably around 8.5. If the pH is higher than about 8.5, the consistency tends to ultimately become to thick and the adhesion is poor. If, on the other hand, the pH is too low, then the glue tends to be of an objectionably granular consistency and will not tolerate sufficient dilution with water. Variation in the quantity of cresylic acid or other phenolic element is also permissible. Increased cresylic acid tends to increase the amount of water required to provide the correct spreading consistency and at the same time to decrease penetration into the wood. I find the phenolic element may be supplied either in the form of phenol or any of the isomeric cresols or xylenols and in the subsequent description and appended claims the words "phenol" or "phenolic element" should be construed as embracing these equivalents. I have, for instance, obtained satisfactory results by the use of orthocresol as the phenolic element. Orthocresol is by far the least reactive of the three cresols and is unsuitable for use in making thermosetting resinous condensation products with formaldehyde.

It is an important characteristic of the adhesive and coating that the same is free from aldehyde elements capable of combining with the phenolic material to form a condensation product. It is also notable that the present adhesive coating is the reaction product of the blood albument and phenolic element within the pH range of 7 to 10 and that in the examples blood is the only protein present. While the principal adhesive is the new chemical compound or reaction product of phenol and blood, the adhesive suspension may include other proteinous adhesive bases such as casein, soybean meal, fish meal and the like which act as modifying agents in accordance with their specific characteristics.

The present invention obtains highly satisfactory results with the important advantage that the processes of the prior art are greatly simplified and without the intervention of elements which could produce an initial phenolic condensation product for interaction with the blood. This absence of any phenolic condensation product in my composition together with other features, such as the superior quick-setting character, distinguishes from such prior art adhesives as those described in U. S. Patent 1,771,553 to Arnot and in U. S. Patent 2,066,857 to Rozema, both of which disclose adhesives which are reaction products of phenolic condensation products associated with or extended by blood albumen.

The present adhesive is extremely quick-setting when heated, is quick-setting at a low range of temperature, and is quick-setting at a low temperature effective to avoid injury to the wood from the pressing treatment. The strength and durability of the bonds produced by the present glue are decidedly marked, although, as has been pointed out, both aldehyde and protein other than blood may be absent from the glue film which comprises the reaction product of phenol and blood.

Manufacture of the present composition avoids the objectionable difficulties which attend the manufacture of a composition using formaldehyde and protein other than blood and also makes it very much easier to produce an entirely uniform product. It is not entirely clear why these advantageous results are obtained, but it is suggested that the prior troubles of lack of uniformity and variable quality may have been due to uncontrollable side reactions which resulted from the presence of the formaldehyde. This seems probable since the formaldehyde could react both with the phenolic and protein elements to produce very complex products. At any rate, I find that the aldehyde is not necessary to make an excellent adhesive and that uniform results are readily obtained with the present composition whereas lack of uniformity was a serious problem with prior formulae.

Example II

The following example illustrates the use of this material as a protective coating in the form of a priming coat for wood surfaces and the like:

| | Parts |
|---|---|
| Product of Example I | 100 |
| Rosin bodied China-wood oil | 10 |
| Drier | 0.15 |
| Water | 10 |

These ingredients are thoroughly mixed and form a very inexpensive aqueous emulsion paint which, owing to the presence of the phenolic element, protects the wood from mold and decay and, at the same time, forms a foundation for finishing coats of oil paint or varnish. The properties of this first coat may be modified in a variety of ways by the addition of various resins, oils, pigments, etc. Rosin bodied China-wood oil has been found preferable because of its quick drying properties and water resistance but numerous other drying oils can be substituted, such as boiled linseed oil, hempseed oil, and the like. It is also possible to use the usual range of driers and combinations such as cobalt, manganese and the like. The peculiar properties of the product of Example I permit the ready emulsification and incorporation of a wide range of oily and resinous materials. The material brushes well and, of course, derives a considerable economy from being deposited from an aqueous medium instead of the usual oily vehicle. In some instances, the product of Example I may be used alone, but it is ordinarily preferable to incorporate a drying oil to improve the bond with subsequent coats of oil base materials.

Other modes of applying the principle of the invention may be employed instead of these herein explained, changes being made as regards the details disclosed, provided the features stated in any of the following claims, or the equivalent of such, be employed.

I claim:

1. A thermosetting adhesive in aqueous suspension containing finely divided amorphous gel-like particles of a chemical reaction product of blood albumen and a phenol and sufficient alkali to impart to the suspension a pH of between about 7 and 10, said suspension being free of formaldehyde.

2. A thermosetting adhesive according to claim 1 in which the alkali is caustic soda.

3. A thermosetting adhesive according to claim 1 wherein the blood is present in predominant amount.

4. A thermosetting adhesive according to claim 1 having a viscosity between substantially 10 and 15, #26 wire MacMichael.

5. A thermosetting adhesive according to claim 1 in which the pH is about 8.5.

OGDEN CARMICHAEL.